United States Patent
Sories et al.

(10) Patent No.: US 8,270,997 B2
(45) Date of Patent: Sep. 18, 2012

(54) LOCALIZED INFORMATION SERVICE

(75) Inventors: Sabine Sories, Aachen (DE); Guido Gehlen, Neuss (DE); Gordian Jodlauk, Würselen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 30 days.

(21) Appl. No.: 12/999,762

(22) PCT Filed: Jun. 24, 2008

(86) PCT No.: PCT/EP2008/058022
§ 371 (c)(1),
(2), (4) Date: Feb. 21, 2011

(87) PCT Pub. No.: WO2009/155969
PCT Pub. Date: Dec. 30, 2009

(65) Prior Publication Data
US 2011/0143781 A1    Jun. 16, 2011

(51) Int. Cl.
*H04W 4/02* (2009.01)

(52) U.S. Cl. .................................... 455/456.3; 370/338

(58) Field of Classification Search ............... 455/456.3, 455/404.2, 404.1, 403, 426.1; 370/338, 351, 370/401, 473, 329, 229, 394; 709/245
See application file for complete search history.

(56) References Cited

U.S. PATENT DOCUMENTS

| | | | |
|---|---|---|---|
| 6,012,012 A | 1/2000 | Fleck et al. | |
| 6,226,686 B1 * | 5/2001 | Rothschild et al. | 709/245 |
| 7,075,929 B2 * | 7/2006 | Korus et al. | 370/390 |
| 2005/0240378 A1 | 10/2005 | Smith et al. | |

FOREIGN PATENT DOCUMENTS

| | | |
|---|---|---|
| EP | 0810803 A2 | 12/1997 |
| EP | 1289220 A1 | 3/2003 |

* cited by examiner

*Primary Examiner* — Phuoc Doan
(74) *Attorney, Agent, or Firm* — Coats & Bennett, P.L.L.C.

(57) ABSTRACT

A method of providing a localized information service using an infrastructure of a cellular communication network is described. It comprises a service source terminal transmitting a network upload message to the cellular communication network, said network upload message comprising a payload part, a reflection entity of said cellular communication network receiving said network upload message, generating one or more reflection messages comprising said payload part, and sending said one or more reflection messages to a group of service destination terminals that stand in a predetermined spatial relationship with said service source terminal.

27 Claims, 12 Drawing Sheets

LOCALIZED INFORMATION SERVICE

TECHNICAL FIELD

The present application relates to a method of providing a localized information service using an infrastructure of a cellular communication network, to a system for providing such a localized information service, to a network entity of a cellular communication network and to a method of controlling such a network entity.

BACKGROUND

It is known to provide so-called Location Based Services (LBS) in cellular communication networks, such as cellular wireless telephone networks. Such services typically comprise mechanisms for estimating the location of a terminal, e.g. with the help of a Global Positioning System (GPS) or a Mobile Positioning System (MPS) that may use Cell-ID information or algorithms based on timing advances and/or triangulation for determining the position of a terminal. Based on the knowledge of a terminals location, specific location based services can be offered to said terminal, e.g. recommendations for restaurants or sightseeing in the surroundings of the terminal.

It is furthermore known to broadcast information with the help of so-called Cell Broadcast Services (CBS), in order to distribute information to terminals within one or more cells. The respective terminals have to enable the listening of the respective broadcast channel. A so-called Multimedia Broadcast and Multicast Service (MBMS) is known that provides a broadband broadcast to mobile terminals. On an application layer, a file transmission using e.g. FLUTE (File Delivery over Unidirectional Transport) or a streaming transmission using RTP (Real Time Transport Protocol) may be used to transmit content to terminals.

Furthermore, emergency services are known, in which upon receiving an emergency message from a mobile terminal, a determination of the location of said terminal is made, in order to e.g. be able to send help to that location, for example in the form of an ambulance.

SUMMARY

One object of embodiments herein is to provide an improved location based service using an infrastructure of a cellular communication network such as a cellular wireless telephone network.

This object is achieved by the subject-matter of the independent claims. Preferred embodiments are described in the dependent claims.

According to an embodiment of the invention, a method is proposed for providing a localized information service using an infrastructure of a cellular communication network, comprising a service source terminal transmitting a network upload message to the cellular communication network, where the network upload message comprises a payload part. A reflection entity is provided to (e.g. in or attachable to) the cellular communication network, which receives the network upload message, generates one or more reflection messages comprising the payload part, and sending one or more reflection messages to a group of service destination terminals that stand in a predetermined spatial relationship with the service source terminal.

Various embodiments herein employ data reflection. Namely a source terminal sends specific content in a payload part of a network upload message. The network upload message is a message that does not contain destination addresses of other terminals (such as e.g. would be the case in an 8M8 or MM8) The network upload message IS however arranged such that it can be recognized as such, I.e. as a message for being reflected, for example by carrying or lacking a predetermined piece of information. Within the network, a reflection entity is provided which is arranged for recognizing the network upload message. The reflection entity II reflects 11 the content in the payload part by simply placing it into messages that are destined for destination terminals that stand in a predetermined spatial relationship with the terminal that sent the network upload message. The predetermined spatial relationship can be determined explicitly by the reflection entity, e.g. by determining the location of the service source terminal that transmitted the network upload message and then determining destination terminals that e.g. are within a predetermined distance of said service source terminal, or the spatial relationship can be established implicitly, e.g. by virtue of the position of the reflection entity itself I which can for example be associated with a network base station and arranged for sending the reflection message to all terminals within the coverage area of said base station.

Embodiments employing data reflection advantageously enable distribution of information to a spatially restricted number of terminals in a fast way, i.e. without much delay, as very little processing is required, because the content in the payload part is "reflected" and not processed further within the communication network.

In this way, a localized information service can be provided in which certain service source terminals (which can preferably also at the same time act as service destination terminals) can trigger an information flow by sending an upload message, which is then promptly reflected by the reflection entity to a spatially limited group of service destination terminals. Such a service can be particularly fast and low in delay if the reflection entity is arranged in association with a base station or eNodeB, i.e. in a radio access network. The closer the reflection entity is to the terminals, the less delay there is. Nonetheless, the reflection entity can also be provided within the core network of the cellular communication network or even outside of the network.

It is noted that the network upload message carries a suitable form of indicator, such that the communication network can recognise it as a message of the network upload type, i.e. destined to be reflected by a reflection entity. Such an indicator can be a server address (where it is noted that if the reflection entity is not the addressed server, then no server actually needs to exist at said address; in other words, the server address can be to a virtual server), or any other form of indicator is suitable, such as a predetermined flag in the message header. It is equally possible that the lack of a predetermined piece of information identifies a network upload message, such as a lack of information in the address field of the message.

According to a further embodiment, a system is proposed for providing a localized information service using an infrastructure of a cellular communication network that comprises a service source terminal arranged for transmitting a network upload message to the cellular communication network, where the network upload message comprises a payload part, and a system further comprises a reflection entity of the cellular communication network that is arranged for receiving the network upload message, generating one or more reflection messages comprising the payload part, and for sending one or more reflection messages to a group of service destination terminals that stand in a predetermined special relationship with the service source terminal.

According to a further embodiment, a network entity as a reflection entity of a cellular communication network is proposed, which comprises a receiver for receiving from the service source terminal the network upload message that comprises the payload part, a message generator for generating one or more reflection messages comprising the payload part, and a message sender for sending the one or more reflection messages to the group of service destination terminals that stand in the predetermined special relationship with the service source terminal.

According to a further embodiment, the invention relates to a method for controlling such a reflection entity, which comprises a procedure for receiving from the service source terminal a network upload message comprising a payload part, a procedure for generating one or more reflection messages comprising the payload part and a procedure for sending the one or more reflection messages to a group of service destination terminals that stand in a predetermined special relationship with the service source terminal.

BRIEF DESCRIPTION OF THE DRAWINGS

Embodiments of the present invention, which are presented for better understanding the inventive concepts but which are not to be seen as limiting the invention, will now be described with reference to the Figures, in which.

DETAILED DESCRIPTION

Figure 1:
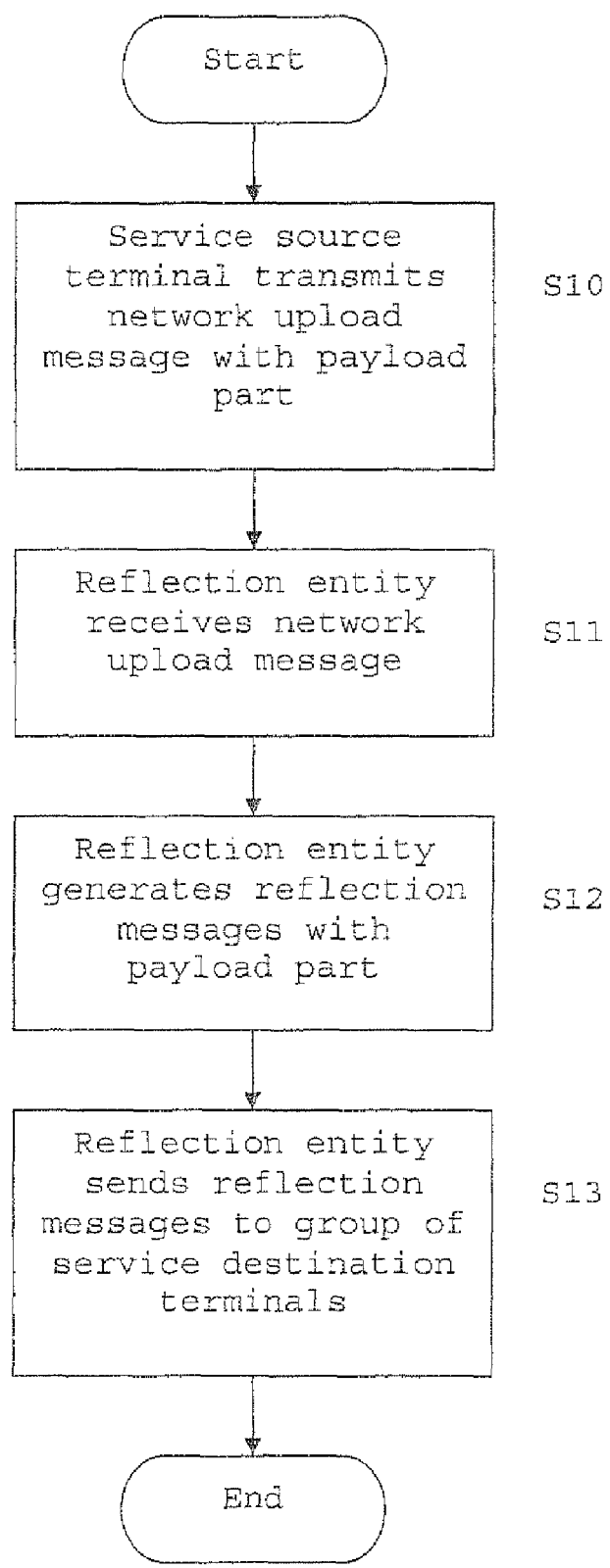
FIG. 1 shows a flowchart of a method embodiment of the invention.

FIG. 1 shows a flowchart of a basic method embodiment of the present invention. In a first step S10 a terminal of a cellular communication network transmits a network upload message to the cellular communication network, where the upload message comprises certain content in a payload part.

The term "network upload message" means that the message is meant to be uploaded to the cellular communication network, but it also means that this is a specific message designed for the localized information service in that it comprises a suitable form of indicator, such that the cellular communication network can recognise it as being a message comprising a payload part comprising content that is to be reflected back to service destination terminals in a localized information service. The indicator can be chosen in any suitable or desirable way, e.g. it can be a predetermined string of data such as a server address, or it can be some other indicator, such as a flag in the header of the message. The indicator can also be a lack of a particular piece of information, e.g. the lack of an address.

The triggering of the network upload message transmission can also be chosen in any suitable or desirable way. For example, a message can be sent by a user of a mobile terminal by appropriately interacting with an application on the mobile terminal, or such a network upload message can also be sent automatically, e.g. in an emergency situation, in which it is desired to alert the surroundings of a potentially dangerous or hazardous situation. In this way, the concept of the present invention can advantageously be applied in the context of a vehicle-mounted system that is arranged to automatically send out a network upload message with a warning or alert content when a suitable detector in the vehicle recognises a dangerous situation, e.g. if an accident detector detects that an accident has occurred.

In step S11 a reflection entity in the cellular communication network receives the network upload message. It is noted that the term "entity" relates to a device or a group of devices for providing the indicated functionality. As such, a node, a node part or a group of nodes can form a network entity.

As indicated above, the network upload message carries a suitable indicator. The reflection entity is arranged for being able to recognise this indicator. This can be done in a variety of ways. For example, the indicator can simply be the address of a service that comprises the reflection entity, such that the network upload messages are forwarded by the network to the reflection entity. In this sense, the server automatically recognises the upload messages. However, it is also possible to e.g. arrange one or more nodes in the cellular communication network to parse messages for the indicator (e.g. a given server address), and to thus recognise and intercept the network upload messages. For example, the reflection entity can be located within a base station, and capable of detecting one or more given server addresses, to then directly perform a reflection operation, i.e. not actually forward the messages towards the indicated address. As can be seen, it is therefore not necessary in this case that a server under said given address actually exists. Equally, the network entity can be arranged to recognise an indicator like a flag in the message header.

In step S12 the reflection entity generates one or more reflection messages comprising the payload part received in the network upload message. For example, the payload part may comprise alert or warning information that the sending terminal wishes to distribute in a specific area around itself. The generation can e.g. comprise that the payload part of the message (which comprises a header with control information and a payload part with content) that is reflected remains untouched, only the header of the message is changed.

The determining of the group of service destination terminals, i.e. which possible terminals should actually receive the reflection message(s) can be done in a variety of ways. For example, the reflection entity can perform or have performed a dedicated determination procedure for establishing the spatial relationship, e.g. by estimating the location of the sending terminal (for example with the help of GPS or the cellular systems Mobile Positioning System (MPS)) and then applying a specific rule (such as "find all terminals within a radius xy") based on estimated locations of terminals that are possible destinations for the information service.

However, the spatial relationship can also be determined implicitly, e.g. based on the location of the reflection entity itself. Namely, if the reflection entity is associated with a node of the cellular communication network that serves a predetermined area (such as a base station), then the spatial relationship can be established as sending the reflection messages to all terminals within said predetermined area, as it is the predetermined area in which the sending terminal is located. Naturally, the spatial relationship could also be defined as sending the reflection messages to terminals in not only the predetermined area (e.g. cell), but also to neighbouring predetermined areas within an area scheme of the cellular communication network (e.g. neighbouring cells).

It is noted that the localized information service can be provided in such a way that only terminals that register for the service are able to act as service source terminals and/or service destination terminals.

In step S13, the reflection entity sends the one or more reflection messages to the service destination terminals that end in the predetermined spatial relationship with the service source terminal. This sending can be done in different ways, as will become evident from examples given further on.

Figure 2:
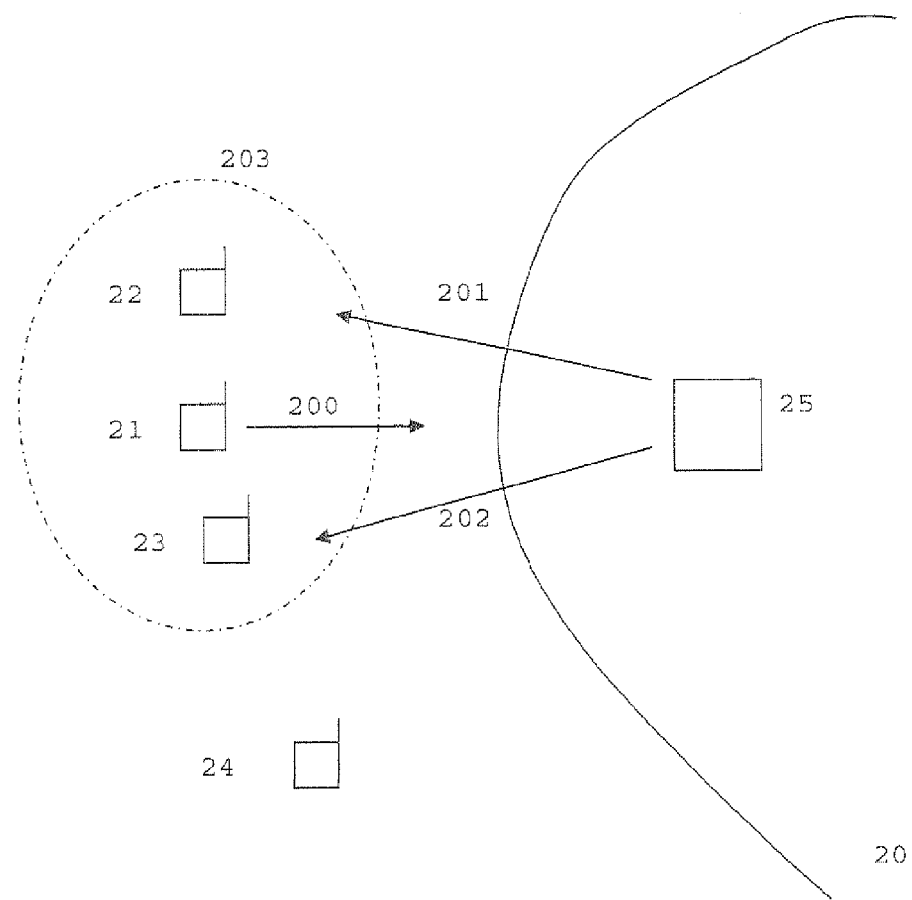
FIG. 2 shows a schematic representation of terminals and a network to which the present invention is applied.

FIG. 2 schematically shows a number of terminals 21-24 of a cellular communication network 20, which comprises a reflection entity 25. In the example shown in the Figure, network terminal 21 acts a service source terminal and sends a network upload message 200 towards the cellular communication network 20. This network upload message 200 is received by reflection entity 25, e.g. because the network upload message 200 is addressed to a server comprising reflection entity 25, or e.g. because reflection entity 25 is capable of reading a dedicated indicator in network upload message 200 and can therefore intercept the message. Reflection entity 25 then generates reflection messages 201, 202 and sends these to network terminals 22 and 23, respectively, which terminals 22 and 23 stand in a predetermined spatial relationship 203 with the terminal 21 that acts as service source terminal in this example. More specifically, in the example FIG. 2 the spatial relationship is shown schematically as an area 203 around terminal 21. As can be seen, terminal 24 is not in the area, i.e. does not stand in the predetermined spatial relationship to terminal 21, such that no reflection message is sent to terminal 24.

In the shown example terminal 21 acted as a service source terminal and terminals 22, 23 as service destination terminals. Preferably, the localizing information service is provided in such a way that a group of terminals, such as terminals 21 to 24 each register for the service and can each act as both a service source terminal and a service destination terminal.

Furthermore, in the example of FIG. 2, the reflection messages 201, 202 were only sent to terminals 22 and 23, but not to source terminal 21. Optionally, reflection entity 25 could also be arranged to send a reflection message back to the service source terminal 21, e.g. in order to allow the service source terminal 21 to confirm proper receipt of the network upload message 200.

As mentioned above, it is preferable that terminals enabled for the localizing information service may act as service source terminals and service destination terminals. However, it is also possible that some terminals only act as service source terminals and others only as service destination terminals.

It should be noted that FIG. 2 only shows a schematic example, and that typically many more terminals will be involved in the localized information service. Furthermore, more than one reflection entity may be provided.

According to a preferred embodiment, the service source terminals and reflection entity are arranged in such a way that they establish and maintain a reflection upload session for providing the localized information service. In other words, the service source terminal, such as terminal 21 in FIG. 2, and reflection entity 25 initially exchange session set-up parameters for establishing a reflection upload session. Furthermore, it is preferable that the service destination terminals 22, 23 and reflection entity 25 establish and maintain respective reflection download sessions. In other words, terminals that wish to act as service destination terminals initially exchange session set-up parameters with the reflection entity 25, in order to establish a reflection download session. It is noted that reflection upload sessions and reflection download sessions can be maintained independently of one another. Preferably, in the event that terminals may act as both service source terminals and service destination terminals, they simultaneously maintain a reflection upload session and a reflection download session, which then becomes a single localized information service session for said given terminal with respect to the reflection entity.

An important aspect of establishing and maintaining sessions is that the reflection entity can keep track of which network terminals are participating in the localized information service, be it as potential service source terminals or as potential service destination terminals. As such, the maintenance of a session may comprise the sending of keep-alive messages from the terminal to the reflection entity, such that the reflection entity is informed that the terminal is still present.

According to a preferred embodiment, a reflection upload session may comprise maintaining a unicast channel of the cellular communication network during the duration of the session, such that a constant connection is upheld between the terminal and the reflection entity. Such a unicast channel can e.g. be a circuit-switched connection or a packet-switched connection, such as a GPRS (General Packet Radio Service) or Universal Mobile Telecommunications System (UMTS) connection between the terminal and the reflection entity. Then, the network upload message is sent over the thus established and maintained unicast channel.

Equally, it is possible that the reflection download session comprises maintaining a unicast channel of the cellular communication network during the duration of the reflection download session, between the reflection entity and respective service destination terminals. Such a unicast channel can again, e.g. be a circuit-switched channel or a packet-switched channel between the service destination terminal and reflection entity.

The advantage of maintaining such a unicast channel is that transmission of the network upload message and/or reflection message is very fast (i.e. with very little delay) as it is not necessary to first set-up a communication channel when sending upload or reflection messages. The reduction of delay for conducting the service is of particular importance when using the service as a localized alert or alarm system, e.g. for vehicle-mounted terminals that alert their environment in case of an emergency or accident.

Figure 7:
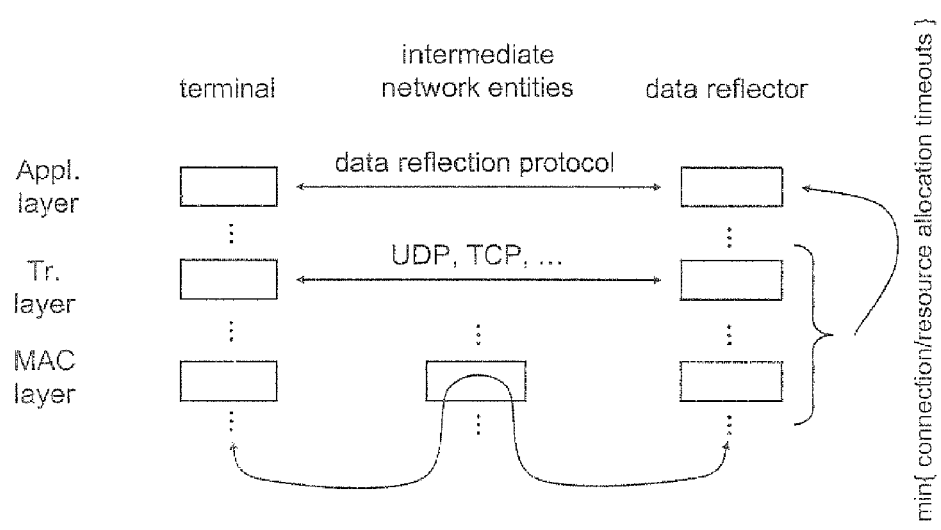
FIG. 7 shows an example protocol stack for explaining an embodiment of the invention.

When considering the communication between terminal and reflection entity, it is preferable that respective applications in the terminal and reflection entity establish the session, and that the communication is maintained over a transport layer connection (e.g. using the user datagram protocol (UDP), transmission control protocol (TCP), etc.), which again is maintained over lower layers, such as a MAC (Media Access Control) layer. An example is shown in FIG. 7.

When sending keep-alive messages from a terminal to the reflection entity as a part of session maintenance, it is preferred that they be sent periodically with a time interval that is set to be shorter than any time-out timer periods used in lower layer communication protocols, e.g. at the transport layer, link layer, MAC layer, etc. In other words, in this way, it can be avoided that a connection is lost due to a lower layer time-out, before the applications in the terminal and reflection entity, which operate at the application layer, have e.g. ended the communication session in a controlled manner. The keep-alive time interval may be pre-configured in the terminals, or the terminals may be adapted to perform an analysis of previous connections from which they can determined a keep-alive time period. Also, the terminals may have an adaptive procedure for adapting the keep-alive time period. Namely, a presently set keep-alive time interval may be increased using a testing mechanism, e.g. prolonging the time interval and testing if the connection holds, and then using the longer time interval if this works out. If a problem is detected, the terminal may fall back to a pre-configured value. Such a test procedure may enact the time period prolongation in a step-wise manner. Alternatively or in addition, the reflection entity may signal a time interval to the terminal that is either then used as a default value or which overrides any other pre-configured time intervals set in the terminal.

In the above-description it was noted that the terminals and reflection entity may maintain unicast channels according to a preferred embodiment. In addition or alternatively, it is also possible to provide the service over shared upload channels, such as for example Random Access Channels of the cellular communication network, and to send reflection messages over broadcast channels or multicast channels of the cellular communication network. The use of shared upload channels and multicast or broadcast channels has the same advantage as maintaining unicast channels, namely that these channels are already set-up, such that channel set-up delays are avoided in the localized information service.

In other words, it is preferable that the localized information service makes use of pre-established and continuously maintained communication channels for sending network upload messages and/or reflection messages.

As mentioned previously, the reflection entity may be arranged in such a way that it performs a spatial relationship determination procedure for determining the group of service destination terminals that have the predetermined spatial relationship. This determination procedure may comprise estimating the location of the service source terminal that sent a network upload message, as well as estimating locations of potential service destination terminals. This can, e.g. comprise analysing a location indicator in the network upload message such as for example positioning data from GPS or a cell ID. Equally, estimating locations of service destinations terminals can comprise that potential service destination terminals periodically send messages to the reflection entity that comprise a location indicator, such as GPS positioning data or a cell ID. Such location indicators can e.g. be regularly sent as a part of a reflection download session, possibly together with keep-alive messages. Equally, the network may estimate the location of service destination terminals by using the MPS of the cellular network.

In order to reduce the potential delay involved in the spatial relationship determination procedure when a network upload message is received, the spatial relationship determination procedure is preferably performed constantly during reflection upload sessions and reflection download sessions in such a way that the reflection entity continuously establishes the group of service destination terminals standing in the predetermined spatial relationship with each potential service source terminal for each potential service source terminal, such that when a network upload message is received from one of the potential service source terminals, the group of service destination terminals for said service source terminal has already been established, such that the reflection messages can be immediately sent. In other words, the reflection entity preferably keeps a continuous record of the group of service destination terminals that stand in a predetermined spatial relationship (e.g. are within a predetermined radius) for each potential service source terminal, such that the group of service destination terminals is immediately available when receiving a network upload message. Thus, no delay is created for determining said group.

The predetermined spatial relationship can also be determined in an implicit way, namely by associating the reflection entity with a node of the cellular communication network that serves a predetermined area. In this case, received network upload messages from a given area can simply be reflected back into said area, without having to perform a specific spatial relationship determination procedure. For example, the reflection can be located at a base station of the cellular communication network in order to reflect network upload messages from the coverage area of said base station back into said coverage area as reflection messages.

It is noted that the concept of performing an explicit spatial relationship determination procedure in the reflection entity and of an implicit determination of the group having the predetermined spatial relationship can be combined, i.e. by a reflection entity may be provided in association with a node that serves a predetermined area, and at the same time also be capable of performing the spatial relationship to determination procedure for one or more of the terminals involved in the localized information service.

According to a further embodiment of the invention, the reflection entity is preferably arranged in such a way that it performs a message anonymization procedure for omitting information identifying the service source terminal from the one or more reflection messages. In other words, in order to maintain privacy of the service source terminal, it is possible to arrange the reflection entity in such a way that only information desired for distribution by the service source terminal in the payload part of the network upload message is copied into the reflection messages, but not information identifying the services source terminal, such as address information.

As already mentioned, the basic concept of the invention and the above embodiments are advantageously applicable within the context of a service in which the service source terminals and/or service destination terminals are vehicle-mounted. Then, a form of traffic alert information service can be enabled by the inventive concept. More specifically, an alert or emergency message can be sent as a network upload message and then reflected to traffic participants in the vicinity of the service source terminal (e.g. within a predetermined radius). The sending of the network upload message can be triggered in any desired way, e.g. manually by a driver of the vehicle, or preferably automatically when a detector in the vehicle detects a predetermined condition judged to merit alerting traffic participants in the vicinity.

Furthermore, in the event of employing reflection upload sessions and/or reflection download sessions, the vehicle-mounted terminals may be arranged in such a way that they automatically establish the respective session, e.g. whenever the vehicle ignition is activated. Naturally, this establishment could also be triggered manually by the driver of the vehicle. Equally, the session can be automatically ended when the ignition is deactivated, i.e. the terminal then sends an appropriate session termination message to the reflection entity.

Furthermore, it is noted that the term vehicle-mounted implies that the terminal is attached to the vehicle, where this may be in permanent form or in removable form. For example, terminals capable of acting as service source terminals or service destination terminals can be mobile telephone terminals that can be appropriately attached to a vehicle interface system, such as a known mobile telephone interface for automobiles. However, the terminals can also be fixedly mounted in the vehicle.

Figure 3:
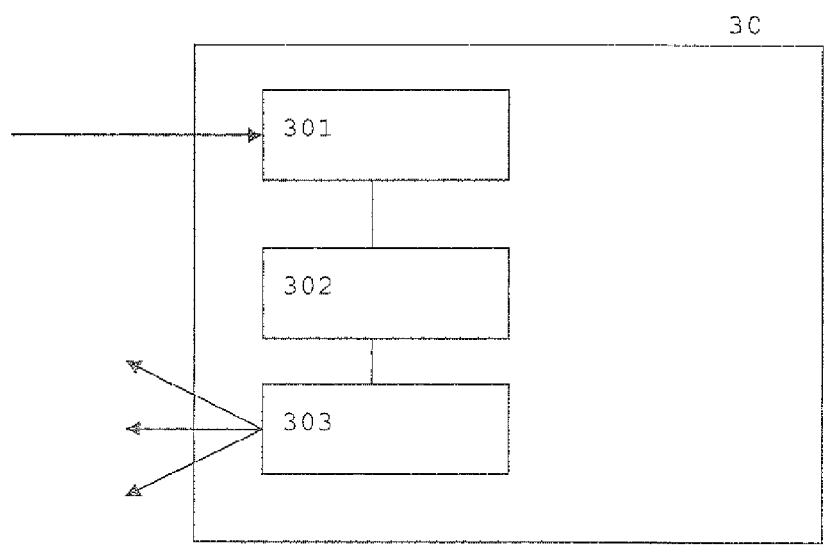
FIG. 3 shows a schematic representation of a network entity according to an embodiment of the invention.

FIG. 3 shows a schematic representation of a network entity 30 arranged to act as a reflection entity. It comprises a receiver 301 for receiving from a service source terminal a network upload message comprising a payload part, a message generator 302 for generating one or more reflection messages comprising the payload part, and a message sender 303 for sending the one or more reflection messages to the group of service destination terminals that stand in predetermined spatial relationship with the service source terminal.

The entity 30 can e.g. be a server and the receiver 301, message generator 302 and message sender 303 can be provided as hardware, software or any suitable combination of hardware and software. For example, they can be provided as computer code parts for execution on a programmable processor.

Figure 4:
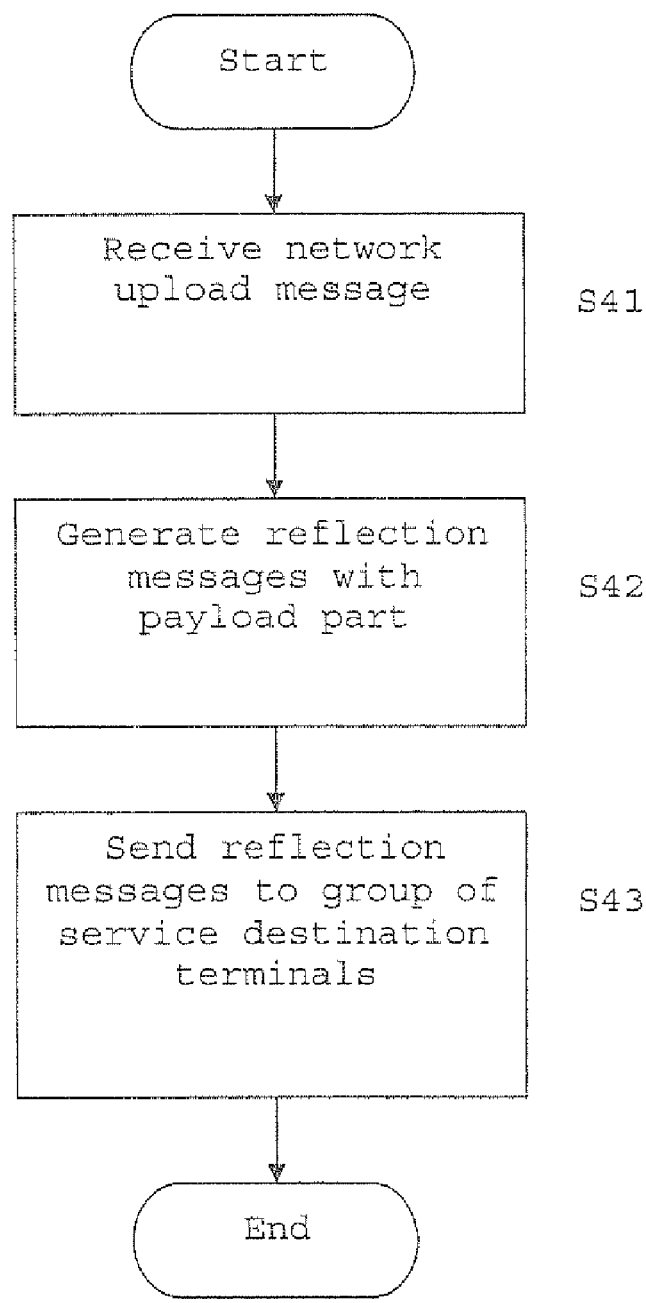
FIG. 4 shows a flowchart of a method embodiment of the present invention for controlling a reflection entity.

FIG. 4 shows a flowchart of a basic control method for a network entity like entity 30, comprising a procedure S41 for receiving from the service source terminal a network upload message comprising the payload part, a procedure S42 for generating one or more reflection messages comprising the payload part, and a procedure S43 for sending the one or more reflection messages to the group of service destination terminals that stand in predetermined spatial relationship with the service source terminal This basic control method, which can be modified according to any of the above-described embodiments can itself be embodied as a computer program or computer program product that comprises computer code parts for performing the control method when executed on a programmable network entity.

In accordance with previously described embodiments, the network entity 30 is preferably also provided with a reflection upload session manager for establishing and maintaining a reflection upload session with a service source terminal. Furthermore, it may comprise a reflection download session manager for establishing and maintaining respective reflection download sessions with service destination terminals. The reflection upload session manager is preferably arranged for maintaining a unicast channel of the cellular communication network during the duration of the reflection upload session, where the receiver 301 is arranged for receiving the network upload message over the unicast channel. Alternatively or additionally, the receiver 301 may be arranged for receiving the upload message over a common access channel of the cellular combination network.

Equally, the section download session manager is preferably arranged such that one or more download sessions comprise maintaining a unicast channel of the cellular communication network during the duration of the reflection download session, where the message sender 303 is arranged for sending the reflection message over the unicast channel. Additionally or alternatively, the message sender 303 may also be arranged for sending the one or more reflection messages over a broadcast or multicast channel of the cellular communication network.

It is noted that the session managers may be provided as hardware, software or any suitable combination of hardware and software.

The reflection entity 30 furthermore preferably comprises a processor for performing a spatial relationship determination procedure for determining the group of service destination terminals. The processor may comprise an analyser for analysing a location indicator in the network upload message. It is noted that the analyser may be provided as hardware, software or any suitable combination of hardware and software. The processor may further comprise an estimator for estimating locations of service destination terminals. The estimator may again be provided as hardware, software or any suitable combination of hardware and software.

As already specified before, the reflection entity 30 may be associated with a node of the cellular communication network that serves a predetermined area such as a base station or eNodeB of the cellular communication network.

Furthermore, the reflection entity 30 may comprise a message anonymizer for omitting information identifying the service source terminal from the one or more reflection messages. The message anonymiser can be provided as hardware, software or any suitable combination of hardware and software.

Now more detailed examples will be described, in which several of the above mentioned embodiments are variably combined.

Figure 5:
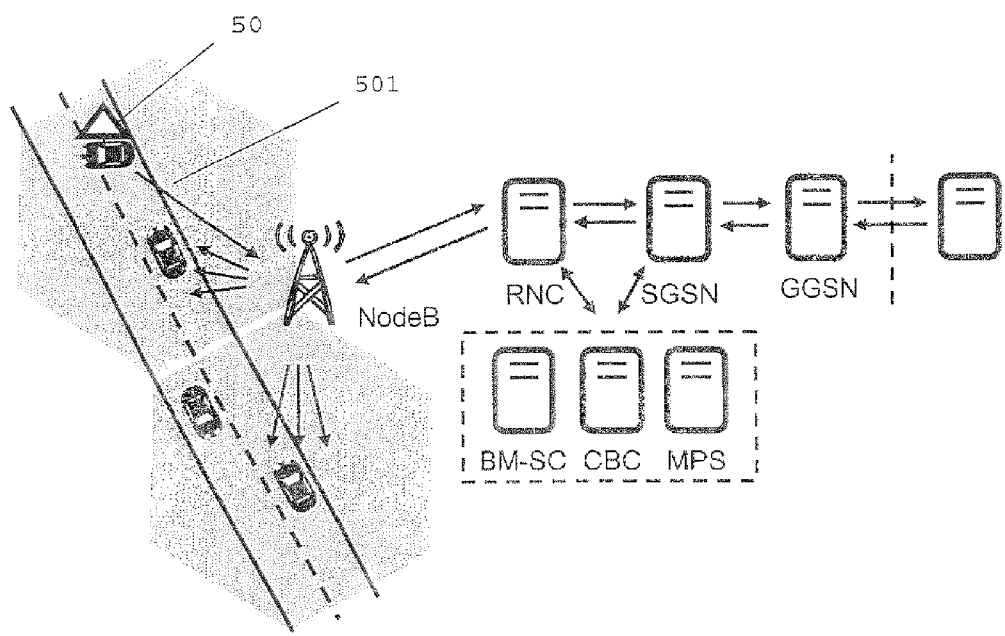
FIG. 5 shows elements of an example network involved in providing a localized information service.

FIG. 5 shows a schematic diagram of an application of the invention to a 3G cellular communication system, in which a terminal 50 mounted in a vehicle sends a network upload message 501 via a NodeB to the network that comprises an RNC (Radio Network Controller), an SGSN (Serving GPRS Service Node), a GGSN (Gateway GPRS Service Node) and a data reflector as an example of a reflection entity, which is connected to the GGSN. Furthermore, a BM-SC (Broadcast Multicast Service Center), a CBC (Cell Broadcast Center) and an MPS (Mobile Positioning Center) are shown.

Figure 6:
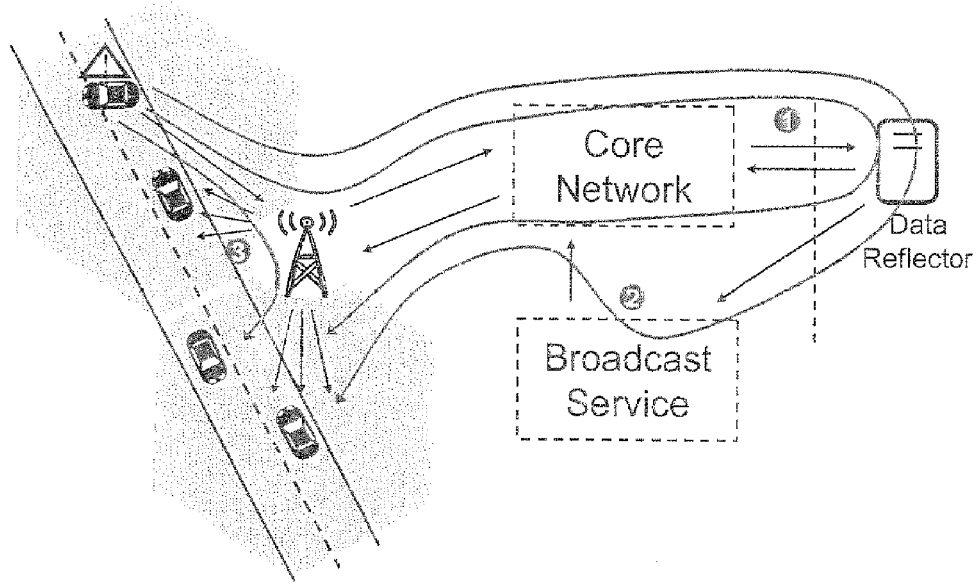
FIG. 6 gives an overview of different variants that may be employed in embodiments of the invention.

FIG. 6 gives an overview of three preferred concepts for placing the reflection entity, which is shown as a data reflector unit, and arranging its operation. Three mechanisms will be explained. As already mentioned, a "network upload message" is characterized by a reflection indicator (e.g. header element, such as flag, and/or specific address or port, etc.) within the header of the message.

Numeral 1 symbolizes a unicast transmission case, in which the data reflector manages a list of terminals (e.g. in vehicles) that are connected (i.e. maintain a connection session) to the data reflector. The list contains an estimation of the current position of each terminal. By receiving a geo-tagged network upload message, the data reflector selects these terminals that are affected by the message and sends it back to these terminals (vehicles). Each terminal tries to keep a transport layer connection to the data reflector and to continuously allocate radio resources in order to avoid time intensive connection establishments.

Numeral 2 symbolizes a case where the network supports a broadcast mechanism, the data reflector decides based on the location information of the network upload messages to which area, i.e. certain set of cells, the packet has to be forwarded. MBMS is one possible broadcast mechanism that can be used.

Numeral 3 symbolizes a case where networks can also be enhanced by an additional new reflection entity integrated in the base station. Such a reflection entity enables a fast reflection of messages even if no location information is embedded in the packets. Thus, the base station implicitly enables a location-based reflection into the cell (and optionally neighboring cells to) where the upload message comes from.

These three examples will now be considered in more detail.

In the unicast case (numeral 1), each vehicle tries to keep a continuous transport layer connection (TCP, UDP, . . . ) to the data reflector, as indicated in FIG. 7. The application layer (reflection) protocol is responsible to keep this connection.

On Medium Access Control (MAC) layer, radio resources are allocated, if data packets have to be transmitted. The application layer (reflection) protocol may keep the radio resources allocated during the entire session in order to avoid resource allocation procedures.

Figure 8:
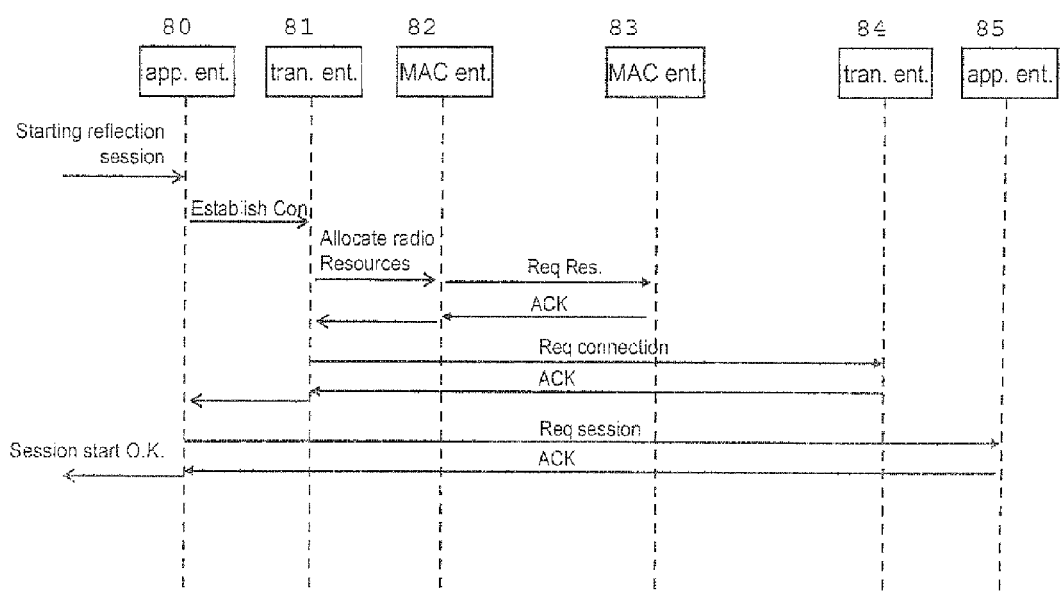
FIG. 8 shows an example of signalling between network elements in an embodiment of the invention.
Figure 9:
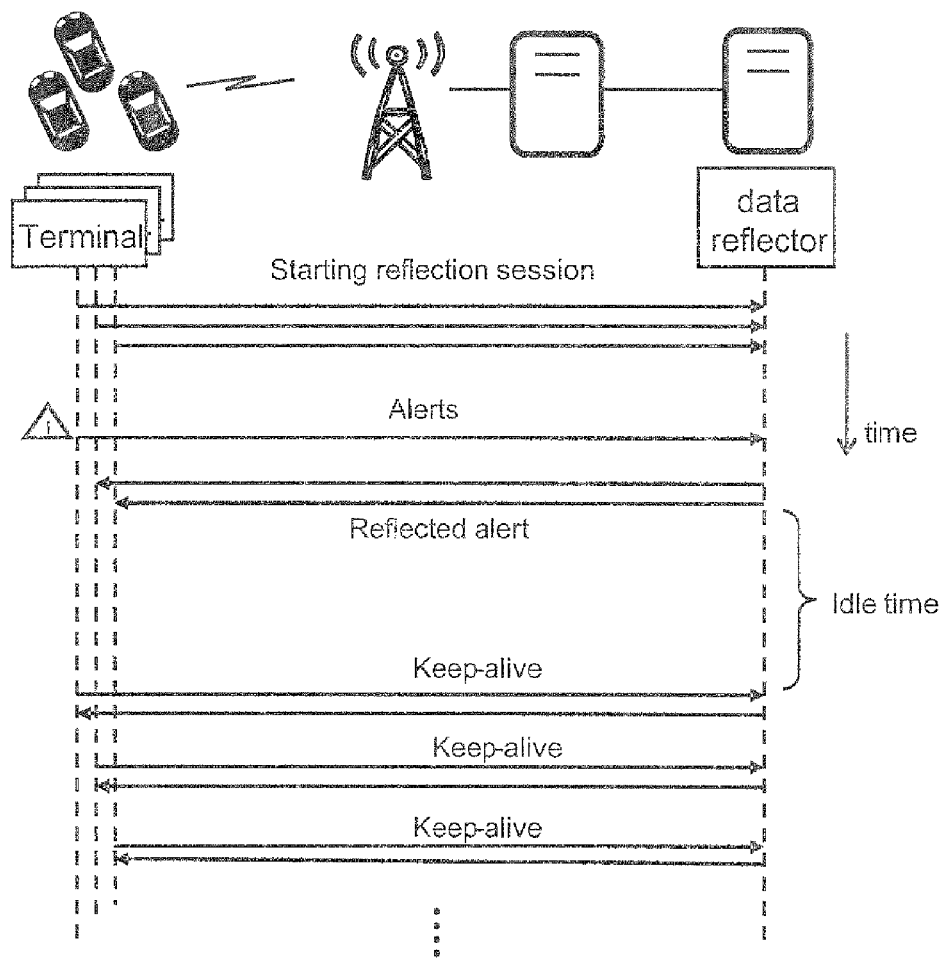
FIG. 9 shows an example of signalling between network elements in a further embodiment of the invention.

Thus, this embodiment may employ the following procedure:

The terminal (vehicle) starts an application layer (reflection) session by establishing a transport layer connection and allocating radio resources. Session parameters, like application type, update frequency, etc., are exchanged with the data reflector. An example of this is shown in FIG. 8. FIG. 8 shows an application layer protocol entity (app. ent.), a transport layer protocol entity (tran. ent.), a MAC layer protocol entity (MAC entity). The three entities 80, 81, 82 on the left hand side are located in the source terminal, the MAC entity 83 in the middle belongs to the network, and the entities 84, 85 on the right belong to the reflector entity. It is noted that the procedure in FIG. 8 represents one arrow of "Starting reflection session" in following FIGS. 9, 10 and 12. It is furthermore noted that these Figures show an alert message as an example of a network upload message and reflected alert messages as examples of reflection messages. These are preferably exchanged on the application layer, and the keep-alive messages, which are also shown, are preferably exchanged on the transport layer.

The terminal sends an upload message and receives reflection messages from other terminals vehicles) to and from the data reflector. The messages are embedded in transport layer (TCP, UDP) packets. Upload messages that arrive at the data reflector are sent back (reflected) according to their location to the list of terminals that have an estimated location inside of the relevance area of the related upload message. The relevance area is an arbitrarily definable geographical area that may depend on the reflection message type and the reflection session parameters.

The data reflector may perform the following procedure after receiving an upload message:

Identifying a session ID (could be included in message, or by correlating terminal ID/address with the session ID)

Extracting related session parameters

Reading out message parameters (message type, location reference). The location reference can be e.g. positioning data from GPS or a CellID.

Deriving the area of relevance (predetermined spatial relationship) of the upload message depending on the session parameters and message parameters. For example: an upload message with "accident alert" flag and the CellID 4711 is received, the corresponding area of relevance may be all 6 bordering cells, in case of hexagonal cells (IDs: 4708, 4709, 4710, 4712, 4713, 4714).

Matching the list of connected terminals with their estimated locations (via cellular network or GPS based tracking) to the area of relevance and extracting all terminals within the area of relevance (→affected terminals) The message source terminal can be excluded or included.

Before sending the reflection message (containing the payload part of the network upload message, and thereby the content intended for distributing by the service source terminal sending the upload message) back to affected terminals (vehicles) the message source IDs and addresses are omitted (according to privacy regulations). However, to prevent misuse, the sender IDs and possible signatures may be recorded in a dedicated monitoring server in order to identify afterwards deliberate infringements.

If during a specific time period no data packets are sent through the established connection, the terminal sends out a keep-alive message (maybe containing useful application data) that will be only reflected to the source terminal and not to further terminals, see 9. This application layer message entails the reset of transport layer and MAC layer timers without knowing the specific protocol state machine behavior. The timers can be determined by knowing the protocol configuration or by using measurements in advance.

The terminal may decide to terminate the data reflection session by sending a message to the data reflector indicating the termination or a timeout at the reflector terminates the session. Receiving a keep-alive message for a timed out session will result in a new session establishment procedure.

Now a broadcast embodiment (numeral 2) will be described with reference to FIG. 10.

The procedure may be:

The terminal starts application layer session (e.g. for counting or registration history) by establishing a transport layer connection and allocating radio resources. There is no need to keep the application layer session active after parameters, like application type, update frequency, etc., have been exchanged with the data reflector.

When there is no data to send, the terminal sends short keep-alive messages (maybe containing useful application data) that will not be reflected to any terminal. This application layer message entails the reset of transport layer and MAC layer timers without knowing the specific protocol state machine behavior of the underlying access network. UE (User Equipment) tracking can be applied, but is not essential for this kind of implementation of the data reflector.

The terminal sends network upload messages to the data reflector. The upload messages may be embedded in transport layer (TCP, UDP) packets. Network upload messages that arrive at the data reflector may be sent to the broadcast service for dissemination of the message inside of the relevance area of that network upload message. Alternatively, only the content part is forwarded with an indication of the relevance area, or a complete reflection message is generated and forwarded together with an indication of the relevance area. The relevance area is an arbitrarily definable geographical area that may depend on the network upload message type and the upload session parameters.

The terminal receives reflection messages by constantly monitoring and listening to a specific broadcast channel dedicated to reflection messages.

The data reflector may perform the following procedure after receiving an upload message:

Reading out message parameters (e.g. message type, location reference). The location reference can be e.g. positioning data from GPS or a CellID.

Deriving the area of relevance of the upload message depending on the message parameters.

The area of relevance is mapped to an available broadcast service specific broadcast area, i.e. service area in case of MEMS.

The reflection message is made anonymous by deleting message source IDs and addresses (according to privacy regulations.

The reflection message, or the upload message, or the content part of the upload message together with area of relevance information is sent to the broadcast service node within the network, which initiates the broadcast of the message in the affected cells, i.e. the reflection message is sent to the BM-SC, which triggers the distribution in associated service areas.

For ensuring a fast data transmission, the broadcast service maintains a constant common channel dedicated to fast reflection messages. Using MBMS, a MBMS Transport Channel could constantly be allocated for reflection messages.

In case of multiplexing different services or priority classes on one transport channel, reflected road traffic alerts could be sent out with the highest priority via the broadcast channel to all terminals in the broadcast area.

Optionally, the terminal can explicitly terminate its data reflection session by sending a data packet to the data reflector indicating the termination.

Figure 11:
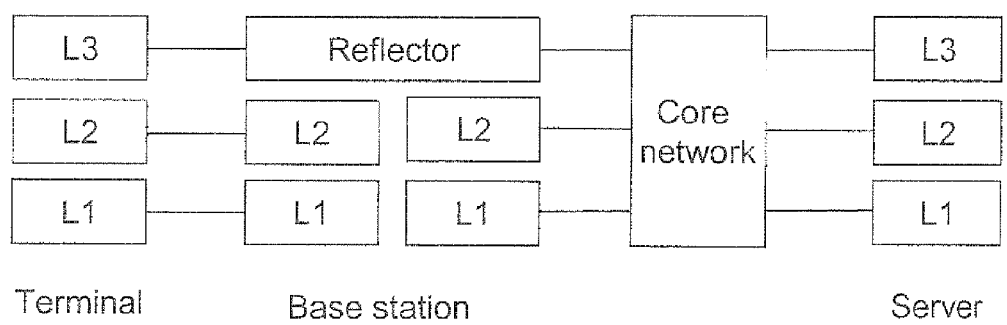
FIG. 11 shows protocol layering in an example in which a reflection entity is provided in a base station.
Figure 12:
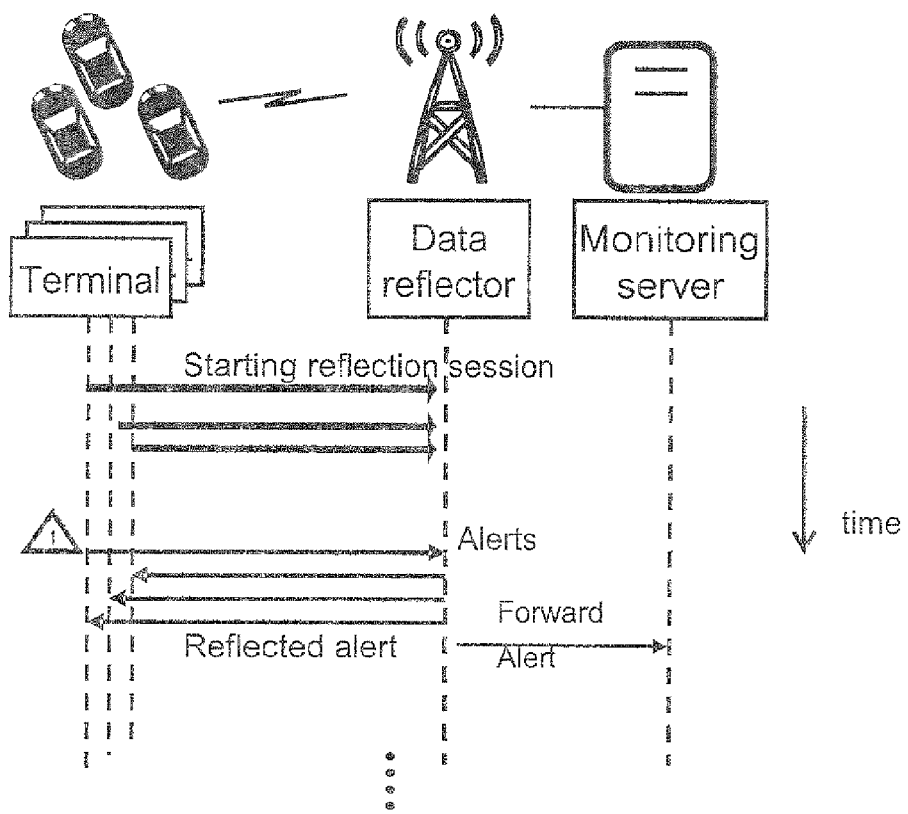
FIG. 12 shows an example of signalling between network elements in a further embodiment of the invention.

Now a local reflection embodiment (numeral 3) will be described with reference to FIGS. 11 and 12.

A reflection entity within the base station allows reflecting messages in a very fast manner. This is possible if the base station is enhanced by a reflection entity (see FIG. 11). In several infrastructure based communication systems, like WiMax (Worldwide Interoperability for Microwave Access) and LTE (Long Term Evolution), the data link layer of the radio link is terminated in the base station. The new reflector entity, however, has access to network layer packets.

The reflector may perform the following procedure:

Checks, if incoming messages are upload messages. This could e.g. be realized by a certain IP address the message is sent to. Another option is to look into the application protocol and check if a reflection tag is set.

If the message is an upload message, the reflector entity can do one or more of the following steps:

The message itself is fed back into downlink direction into the cell of origin. This can be accomplished by changing the network layer address to a multicast/broadcast address.

Depending on the message type, in addition, the message may be sent to surrounding base stations. In LTE (Long Term Evolution), this would be a data exchange over the X2 interface. The base station may maintain a neighbor list for this functionality.

Furthermore, the network upload message or information thereon may be forwarded to a server (indicated as "Monitoring server" in FIG. 12) via the core network in order to log all reflection messages (prevent misuse). It is noted that such a monitoring server can be employed in all of the above embodiments.

For this implementation of data reflection, no location reference is needed. The location-awareness is taken implicitly into account.

Embodiments of the invention can improve the delay performance of localized information services in cellular networks (reduces transmission latencies) and enable thereby novel applications, like road traffic hazard warnings, i.e. vehicles are able to warn vehicles in the proximity on accidents, critical driving situations, slippery road conditions, etc.

Although detailed embodiments have been described, these only serve to provide a better understanding of the invention defined by the appended claims, and are not to be seen as limiting.

The invention claimed is:

1. A method of providing a localized information service using an infrastructure of a cellular communication network, the method comprising:
    transmitting from a service source terminal to the cellular communication network a network upload message that comprises a payload part,
    receiving said network upload message at a reflection entity of said cellular communication network, said reflection entity located at a base station that serves a predetermined area;
    generating at said reflection entity one or more reflection messages comprising said payload part, and
    sending said one or more reflection messages from said reflection entity to a group of service destination terminals that stand in a predetermined spatial relationship with said service source terminal.

2. The method of claim 1, wherein said service source terminal and said reflection entity establish and maintain a reflection upload session for providing said localized information service.

3. The method of claim 2, wherein said reflection upload session comprises maintaining a unicast channel of said cellular communication network during the duration of said session, where said network upload message is sent over said unicast channel.

4. The method of claim 1, wherein said network upload message is sent over a shared channel of said cellular communication network.

5. The method of claim 1, wherein said service destination terminals and said reflection entity establish and maintain respective reflection download sessions.

6. The method of claim 5, wherein each reflection download session comprises maintaining a unicast channel of said cellular communication network during the duration of said reflection download session, where said reflection message is sent over said unicast channel.

7. The method of claim 1, wherein said one or more reflection messages are sent over a broadcast channel or multicast channel of said cellular communication network.

8. The method of claim 1, further comprising performing a spatial relationship determination procedure at said reflection entity for determining said group of service destination terminals.

9. The method of claim 8, wherein said spatial relationship determination procedure comprises analyzing a location indicator in said network upload message.

10. The method of claim 8, wherein said spatial relationship determination procedure comprises estimating locations of service destination terminals.

11. The method of claim 1, further comprising performing a message anonymization procedure at said reflection entity for omitting information identifying said service source terminal from said one or more reflection messages.

12. The method of claim 1, wherein at least one of said service source terminal and the service destination terminals in said group are vehicle mounted.

13. The method of claim 1, wherein said service source terminal is vehicle mounted and wherein transmitting said network upload message comprises sending said network upload message automatically in response to detecting a predetermined condition that merits alerting traffic participants in the vicinity.

14. A system for providing a localized information service using an infrastructure of a cellular communication network, the system comprising:
- a service source terminal configured to transmit to the cellular communication network a network upload message that comprises a payload part,
- a reflection entity that is located at a base station serving a predetermined area and that is configured to receive said network upload message, to generate one or more reflection messages comprising said payload part, and to send said one or more reflection messages to a group of service destination terminals that stand in a predetermined spatial relationship with said service source terminal.

15. A network entity of a cellular communication network, comprising:
- a receiver for receiving from a service source terminal a network upload message comprising a payload part,
- a message generator for generating one or more reflection messages comprising said payload part, and
- a message sender for sending said one or more reflection messages to a group of service destination terminals that stand in a predetermined spatial relationship with said service source terminal,
- wherein the network entity is located at a base station of said cellular communication network that serves a predetermined area.

16. The network entity of claim 15, wherein said network entity further comprises a reflection upload session manager for establishing and maintaining a reflection upload session with said service source terminal.

17. The network entity of claim 16, wherein said reflection upload session manager is configured to maintain a unicast channel of said cellular communication network during the duration of said reflection upload session, and wherein said receiver is configured to receive said network upload message over said unicast channel.

18. The network entity of claim 15, wherein said receiver is configured to receive said upload message over a common access channel of said cellular communication network.

19. The network entity of claim 15, wherein said network entity further comprises a reflection download session manager for establishing and maintaining respective reflection download sessions with said service destination terminals.

20. The network entity of claim 19, wherein said reflection download session manager is configured to maintain a unicast channel of said cellular communication network during the duration of said reflection download session, and wherein said message sender is configured to send said reflection message over said unicast channel.

21. The network entity of claim 15, wherein said message sender is configured to send said one or more reflection messages over a broadcast channel or multicast channel of said cellular communication network.

22. The network entity of claim 15, further comprising a processor for performing a spatial relationship determination procedure for determining said group of service destination terminals.

23. The network entity of claim 22, wherein said processor comprises an analyzer for analyzing a location indicator in said network upload message.

24. The network entity of claim 22, wherein said processor comprises an estimator for estimating locations of service destination terminals.

25. The network entity of claim 15, further comprising a message anonymizer for omitting information identifying said service source terminal from said one or more reflection messages.

26. A method of controlling a network entity in a cellular communication network, said method comprising
- receiving from a service source terminal a network upload message comprising a payload part,
- generating one or more reflection messages comprising said payload part, and
- sending said one or more reflection messages to a group of service destination terminals that stand in a predetermined spatial relationship with said service source terminal,
- wherein the network entity is located at a base station of said cellular communication network that serves a predetermined area.

27. A computer program product stored on a computer readable medium and comprising computer code parts that, when executed on a programmable network entity that is located at a base station of a cellular communication network that serves a predetermined area, cause the programmable network entity to:
- receive from a service source terminal a network upload message comprising a payload part,
- generate one or more reflection messages comprising said payload part, and
- send said one or more reflection messages to a group of service destination terminals that stand in a predetermined spatial relationship with said service source terminal.

* * * * *

UNITED STATES PATENT AND TRADEMARK OFFICE
CERTIFICATE OF CORRECTION

PATENT NO. : 8,270,997 B2
APPLICATION NO. : 12/999762
DATED : September 18, 2012
INVENTOR(S) : Sories et al.

It is certified that error appears in the above-identified patent and that said Letters Patent is hereby corrected as shown below:

In the Drawings

In Fig. 8, Sheet 8 of 12, delete " Establish Con " and insert -- Establish Con --, therefor.

Figure 10:
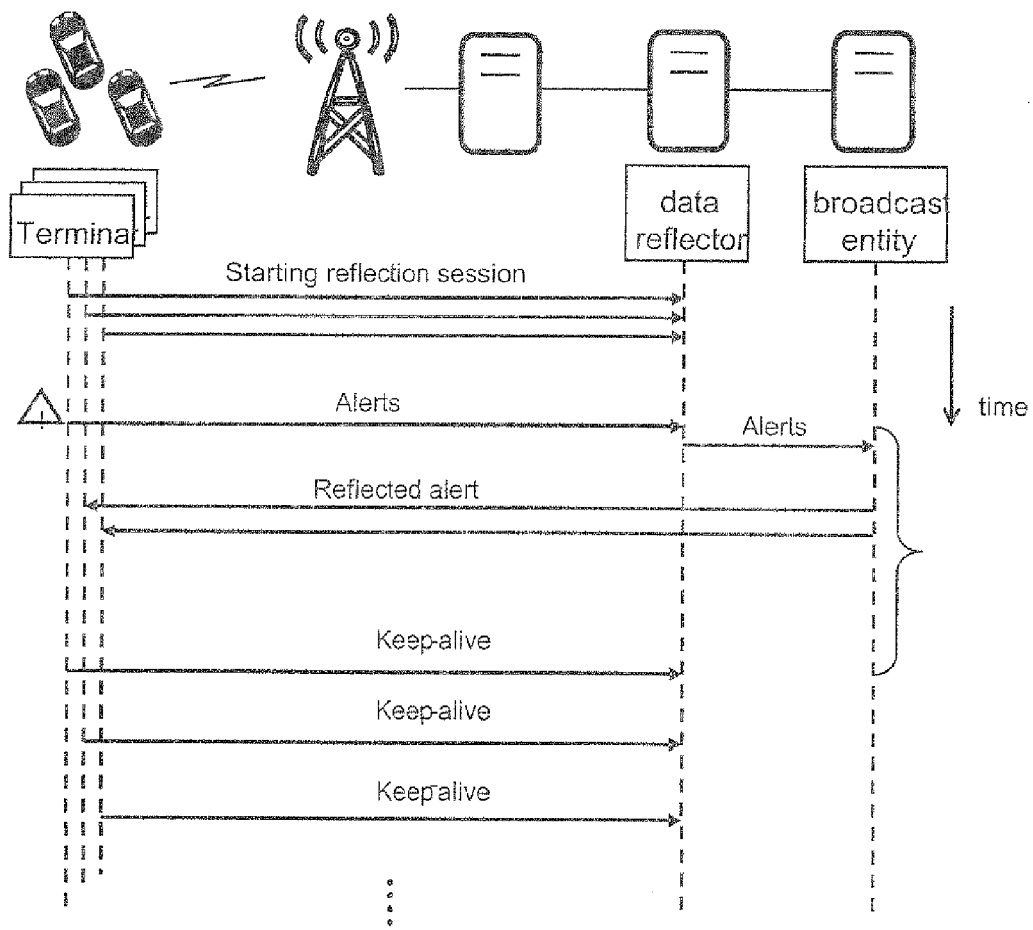
FIG. 10 shows an example of signalling between network elements in a further embodiment of the invention.

In Fig. 10, Sheet 10 of 12, delete "Termina" and insert -- Terminal --, therefor.

In Fig. 10, Sheet 10 of 12, delete " Alerts " and insert -- Alerts --, therefor.

In Fig. 10, Sheet 10 of 12, delete "Keep˙alive" and insert -- Keep-alive --, therefor.

In the Specification

In Column 1, Line 47, delete "communication network" and insert -- communication network, --, therefor.

In Column 1, Line 66, delete "Namely" and insert -- Namely, --, therefor.

In Column 2, Lines 2-3, delete "8M8 or MM8)" and insert -- SMS or MMS). --, therefor.

In Column 2, Line 3, delete "IS" and insert -- is --, therefor.

In Column 2, Line 4, delete "I.e." and insert -- i.e. --, therefor.

In Column 2, Line 8, delete "II reflects 11" and insert -- "reflects" --, therefor.

In Column 2, Line 19, delete "itself I" and insert -- itself, --, therefor.

Signed and Sealed this
Twenty-ninth Day of December, 2015

Michelle K. Lee
*Director of the United States Patent and Trademark Office*

CERTIFICATE OF CORRECTION (continued)
U.S. Pat. No. 8,270,997 B2

In Column 9, Line 29, delete "terminal" and insert -- terminal. --, therefor.

In Column 11, Line 43, delete "ID)" and insert -- ID). --, therefor.

In Column 11, Line 44, delete "parameters" and insert -- parameters. --, therefor.

In Column 11, Lines 59-60, delete "terminals)" and insert -- terminals). --, therefor.

In Column 12, Line 67, delete "MEMS." and insert -- MBMS. --, therefor.

In the Claims

In Column 16, Line 22, in Claim 26, delete "comprising" and insert -- comprising: --, therefor.